United States Patent
Cherif et al.

(10) Patent No.: US 10,423,228 B2
(45) Date of Patent: Sep. 24, 2019

(54) HAPTIC TOUCH SCREEN AND METHOD OF OPERATING THE SAME

(71) Applicants: Northwestern University, Evanston, IL (US); Tanvas, Inc., Chicago, IL (US)

(72) Inventors: Mondher Cherif, Evanston, IL (US); James Edward Colgate, Evanston, IL (US); Michael Frederick David Olley, Lake Zurich, IL (US); Michael A. Peshkin, Evanston, IL (US)

(73) Assignees: Northwestern University, Evanston, IL (US); Tanvas, Inc., Chicago, IL (US)

( * ) Notice: Subject to any disclaimer, the term of this patent is extended or adjusted under 35 U.S.C. 154(b) by 195 days.

(21) Appl. No.: 15/606,440

(22) Filed: May 26, 2017

(65) Prior Publication Data

US 2017/0344119 A1    Nov. 30, 2017

Related U.S. Application Data

(60) Provisional application No. 62/342,594, filed on May 27, 2016.

(51) Int. Cl.
*G06F 3/01* (2006.01)
*G06F 3/044* (2006.01)

(52) U.S. Cl.
CPC .............. *G06F 3/016* (2013.01); *G06F 3/044* (2013.01); *G06F 2203/04103* (2013.01)

(58) Field of Classification Search
CPC ........... G06F 2203/04103; G06F 3/016; G06F 3/044; G09G 5/003; F15D 1/12; B64C 3/48; G02B 26/0825; G09B 21/003
See application file for complete search history.

(56) References Cited

U.S. PATENT DOCUMENTS

| | | | |
|---|---|---|---|
| 2005/0030292 A1* | 2/2005 | Diederiks | G09B 21/003 345/173 |
| 2005/0157893 A1* | 7/2005 | Pelrine | B64C 3/48 381/190 |
| 2009/0250267 A1* | 10/2009 | Heubel | G06F 3/016 178/18.03 |
| 2012/0128960 A1* | 5/2012 | Busgen | F15D 1/12 428/220 |
| 2012/0286847 A1* | 11/2012 | Peshkin | G06F 3/016 327/517 |
| 2012/0287068 A1 | 11/2012 | Colgate et al. | |
| 2013/0063394 A1* | 3/2013 | Wakuda | G06F 3/016 345/174 |

(Continued)

FOREIGN PATENT DOCUMENTS

WO    WO2012039876    3/2012
WO    WO2015127270    8/2015

OTHER PUBLICATIONS

International Search Report dated Aug. 29, 2017 issued in connection with PCT/US2017/034750; 4 pages.

(Continued)

*Primary Examiner* — Richard J Hong
(74) *Attorney, Agent, or Firm* — Vedder Price P.C.

(57) ABSTRACT

A haptic touch screen including a lower layer including a plurality of control electrodes, an upper layer including a plurality of haptic electrodes, a middle layer between the lower layer and upper layer, where the haptic electrodes are not conductively connected to control electronics.

18 Claims, 10 Drawing Sheets

(56) References Cited

U.S. PATENT DOCUMENTS

| | | | |
|---|---|---|---|
| 2013/0176608 A1* | 7/2013 | Brokken | G02B 26/0825 |
| | | | 359/224.1 |
| 2015/0355710 A1* | 12/2015 | Modarres | G09G 5/003 |
| | | | 345/173 |
| 2016/0070399 A1 | 3/2016 | Hotelling | |
| 2016/0124548 A1 | 5/2016 | Cherif et al. | |

OTHER PUBLICATIONS

International Written Opinion dated Aug. 29, 2017 issued in connection with PCT/US2017/034750; 7 pages.

\* cited by examiner

HAPTIC TOUCH SCREEN AND METHOD OF OPERATING THE SAME

PRIORITY CLAIM

The present disclosure is a Non-Provisional Patent Application claiming the benefit of and priority to U.S. Provisional Patent Application No. 62/342,594, filed on May 27, 2016, which is incorporated by reference herein in its entirety.

BACKGROUND OF THE INVENTION

The origin of the word haptics is the Greek haptikos, meaning able to grasp or perceive. Conventional touch screens lack the ability to convey the feel of the objects displayed on the touch screen. Many methods to convey touch have been presented that utilize sound waves and electrical signals. However, each of these methods requires the addition of devices to generate the sound or electrical signals and to transmit the haptic signal. These devices add both cost and complexity to the touch screen.

Cellular devices present a unique problem due to their compact size and reduced thickness. Adding in conventional haptic features increases the thickness and weight of the cellular devices, which reduces the value and the usability of the cellular device. In addition, haptic devices utilizing sound may generate resonant noise that is not desired by the user of the cellular device. Therefore, a need exists that will allow for haptic touch to be added to a touch screen without the addition additional components that add weight to the touch screen.

BRIEF SUMMARY OF THE INVENTION

One embodiment of the present disclosure includes a haptic touch screen that may include a lower layer including a plurality of control electrodes, an upper layer including a plurality of haptic electrodes, a middle layer between the lower layer and upper layer, where the haptic electrodes are not conductively connected to control electronics.

In another embodiment, the haptic electrodes may not be in electrical communication with one another.

In another embodiment, each haptic electrode may mirror a control electrode.

In another embodiment, a width of each haptic electrode may be greater than a characteristic distance between asperities on the skin of a fingertip.

In another embodiment, each haptic electrode may be diamond shaped and may be aligned with a corresponding diamond shaped control electrode.

In another embodiment, the each haptic electrode may interconnect with at least one haptic electrode.

In another embodiment, each haptic electrode may be dumbbell shaped.

In another embodiment, each haptic electrode may have a smaller pitch than the pitch of each control electrode.

In another embodiment, the pitch of each control electrode may be approximately 5 mm and each haptic electrode may be 5 mm across.

In another embodiment, the haptic electrodes may be grouped with each group of haptic electrodes having a different charge.

Another embodiment of the present disclosure includes a method of creating a haptic touch screen, the method including forming an upper layer including a plurality of haptic electrodes, forming a lower layer including a plurality of control electrodes, forming a middle layer between the lower layer and upper layer, where the haptic electrodes are not conductively connected to control electronics.

In another embodiment, the haptic electrodes may not be in electrical communication with one another.

In another embodiment, each haptic electrode may mirror a control electrode.

In another embodiment, a width of each haptic electrode may be greater than a characteristic distance between asperities on the skin of a fingertip.

In another embodiment, each haptic electrode may be diamond shaped and may be aligned with a corresponding diamond shaped control electrode.

In another embodiment, the each haptic electrode may interconnect with at least one haptic electrode.

In another embodiment, each haptic electrode may be dumbbell shaped.

In another embodiment, each haptic electrode may have a smaller pitch than the pitch of each control electrode.

In another embodiment, the pitch of each control electrode may be approximately 5 mm and each haptic electrode may be 5 mm across.

In another embodiment, the haptic electrodes may be grouped with each group of haptic electrodes having a different charge.

DETAILED DESCRIPTION OF THE INVENTION

The present disclosure relates to a haptic device having a layer of electrodes that generate a haptic effect without directly receiving a haptic signal. These electrodes are said to be "floating" because they are not conductively connected to any signal source or to earth or device ground. This "upper layer" of electrodes is provided on the touch surface of a substrate, such as the cover lens of a touchscreen assembly. Typically, the upper layer is covered by a cover layer, which may be transparent. The cover layer may be a hard, transparent coating such as sapphire like glass, and it may be a multi-layer coating in which some layers provide index-matching, anti-reflective, anti-glare, oleophobic, scratch resistance, or anti-bacteria functions, as known in the art. The cover layer may have a smooth surface that covers the haptic electrodes in the upper layer or it may have a texture in order to improve optical or tactile properties. In one embodiment, the cover layer, upper layer and a dielectric layer positioned below the upper layer are mounted on the top surface of a touch screen.

A haptic effect is created when a human finger or other appendage is placed above one or more electrodes on the upper layer and the electrical potentials of at least one but potentially multiple electrodes in the upper layer that are underneath the finger differ from the electrical potential of the finger. In this situation, an attractive force is generated between the finger and the touch surface, which tends to pull the finger into more intimate contact with the touch surface, modifying friction. This change in friction, which may be modulated as a function of time or finger position or other variables, is experienced as a haptic effect.

In the present invention, the electrodes in the upper layer are not conductively connected to one another, or to control electronics. Also provided, however, is a "lower layer" of control electrodes that are conductively connected to control electronics. In this invention, electrical signals for providing haptics as well as touch sensing are introduced via electrodes on the lower layer. The upper layer and lower layer are separated by a middle layer, which may be transparent. The middle layer is typically thick enough to provide mechanical protection to the lower layer. In one embodiment, the middle layer has a thickness of between 10 μm to 10 mm.

Figure 1:
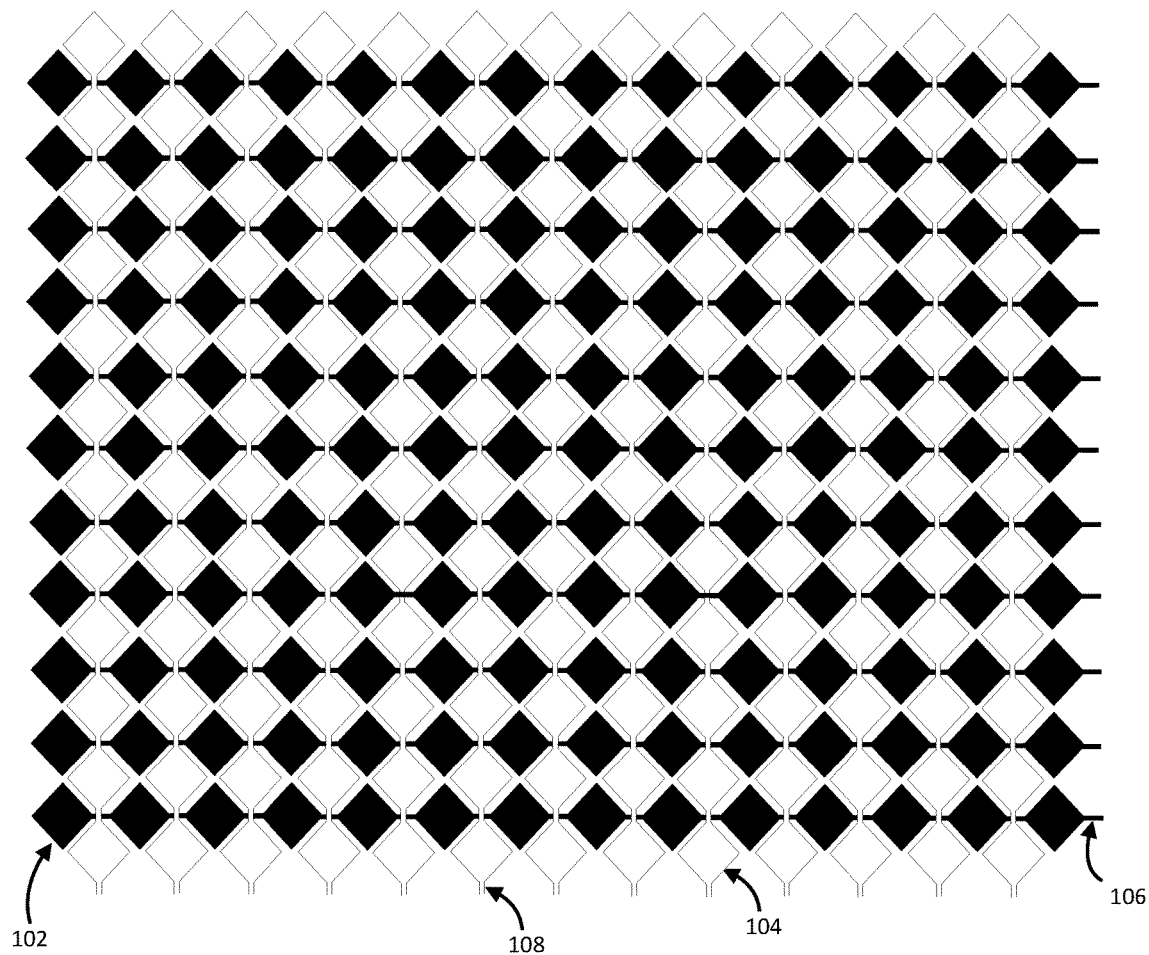
FIG. 1 depicts the arrangement of control electrodes in the lower layer.

FIG. 1 depicts a typical arrangement of control electrodes in a lower level of a haptic device. This arrangement, which is well known in the art, consists of two axes of electrodes. Electrodes 102 are oriented along a first axis and connected via a first signal line 106, and electrodes 104 are oriented along a second, typically orthogonal, axis and connected by a second signal line 108. This arrangement (in the absence of any top layer of electrodes) is often used for sensing touch locations.

Location in touch devices is detected using two approaches, self-capacitance and mutual capacitance. The self-capacitance approach consists of a series of measurements of the current or charge required to change the voltage of each individual line by a given amount. If a finger is placed nearby an electrode, it will alter the current or charge measurement, giving a signal. Touch locations can be inferred by examining these signals on both axes. The mutual capacitance approach requires one axis of electrodes to be treated as transmitters, and the second axis of electrodes to be treated as receivers. A voltage may be applied to a transmission electrode and the resulting signal, typically a charge or current, may be measured at each receiving electrode. If a finger is placed near the intersection of an electrode on the first axis and another electrode on the second axis, it will alter the signal on the receiving electrode. Significantly, both sensing strategies may be used in conjunction with the present invention, although the presence of the upper layer of electrodes may modify details of the implementation.

The control electrodes 102 and 104 can additionally be used to introduce haptic signals. For instance, a voltage applied to one control electrode will, via capacitive coupling, alter the potential of each of the floating electrodes in the upper layer. This change in potential can cause a difference in potential relative to the human finger, resulting in a change in friction as described above. The use of a single control voltage (relative to some ground, such as earth ground or the local ground of the touch device), is termed "unipolar" operation. A haptic effect may also be bipolar, in which case it is caused by the simultaneous use of positive and negative voltages (relative to some ground, such as earth ground or the local ground of the touch device) on separate control electrodes 102 and 104. For instance, a positive voltage may be applied to a control electrode 102 on a first axis via signal line 106, and a negative voltage may be applied to a control electrode 104 on a second axis via signal line 108. In the absence of an upper layer, a finger placed on the touch surface above both electrodes 102 and 104 and close to the place where they intersect, will experience a haptic effect regardless of the potential of the finger or body. The strength of this effect, however, will depend on the thickness of the middle layer, diminishing as the middle layer grows thicker. This same strategy may, however, be implemented with the present invention as well (even with a thicker middle layer), but it is important to ensure that the capacitive coupling from the lower layer to the upper layer is configured such that floating electrodes on the upper layer may adopt different potentials from one another. In the following, we teach appropriate electrode configurations.

In one embodiment, the configuration of the floating electrodes is identical to the configuration of the control electrodes (e.g., as shown in FIG. 1). The only difference is that there would be no signal lines 106, 108 connecting the floating electrodes to the control electronics. In other words, the floating electrodes may not be in electrical communication with one another. Additionally, the two layers may be aligned such that each floating electrode lies directly above a corresponding control electrode. This "mirrored" arrangement establishes a strong capacitive coupling from each control electrode to its corresponding floating electrode such that signals applied to the control electrode are largely passed on to the floating electrodes. An advantage of this approach is that the floating electrodes may be thought of as extensions of the control electrodes, and known techniques for both sensing and haptics (as well as simultaneous sensing and haptics) may be used without modification. In another embodiment, the configuration of the floating electrodes is different than the configuration of the control electrodes.

A disadvantage of the "mirrored" approach is that the floating electrodes cannot be manufactured from a single layer of conductive material, due to the need for one axis to cross over the other. While known techniques, such as two closely spaced sub-layers, or conductive bridges, may be used, these add cost and complexity. Moreover, certain techniques, such as bridges, may be too fragile for front surface implementation. For these reasons, it is preferable to form the floating electrodes from a single layer of conductive material, with no bridges.

Figure 2:
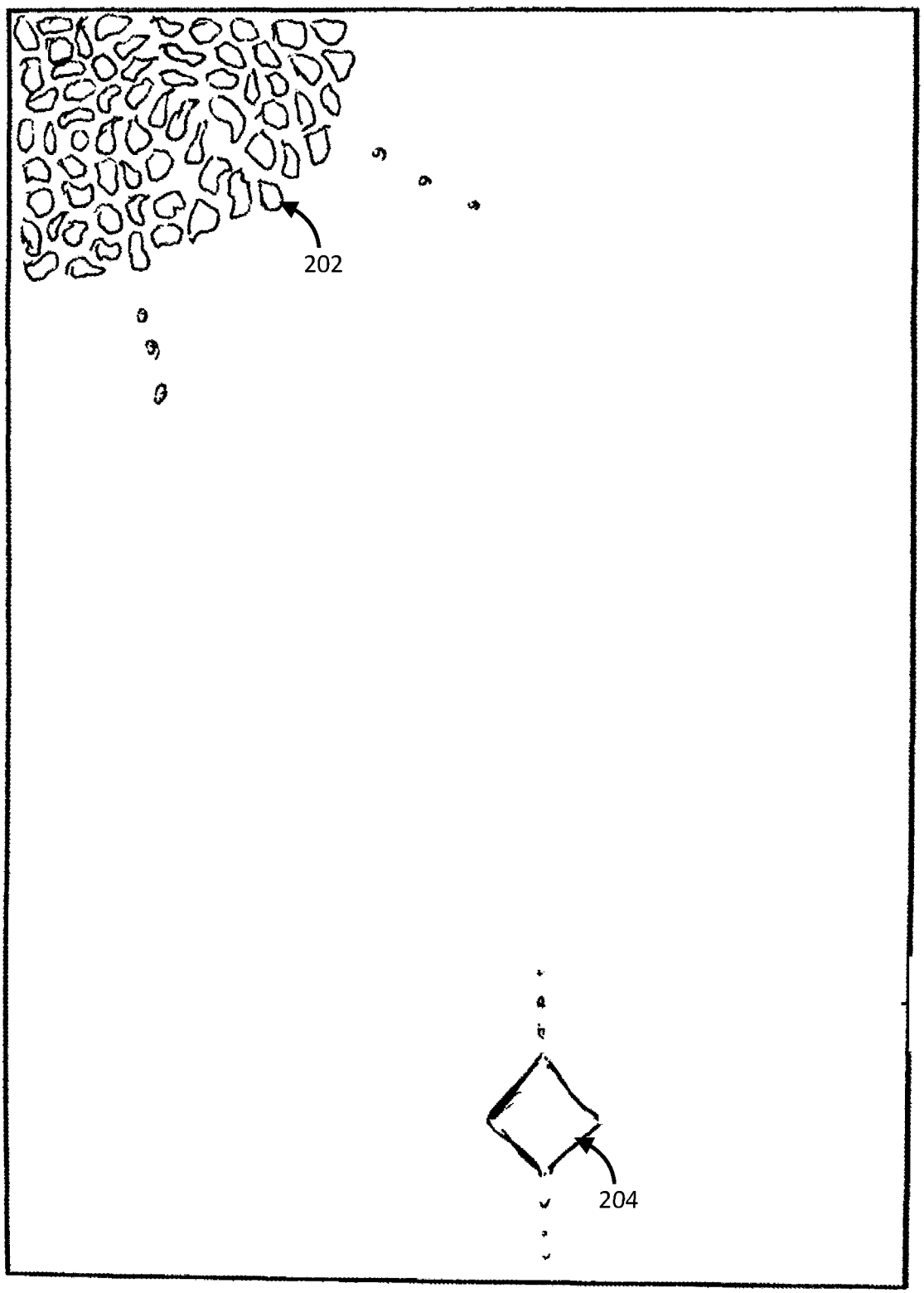
FIG. 2 depicts an arrangement of "small" floating electrodes on the top layer.

FIG. 2 depicts one embodiment of a single-layer set of floating electrodes. Here, the floating electrodes 202 may have virtually any shape, but are considerably smaller than the pitch of the control electrodes 204. For instance, if the pitch of the control electrodes 204 is 5 mm, then the floating electrodes 202 may each be approximately 0.5 mm across. The small size of the floating electrodes 202 means that they will not convey charge laterally across the surface by a large enough amount to disturb sensing. Yet, so long as the width of the floating electrodes 202 is greater than the characteristic distance between asperities on skin of the fingertip, charge will be conveyed laterally to those locations where contact between the skin and surface is most intimate. At these locations, strong normal forces will be generated, as compared to a situation in which the floating electrodes 202 are entirely absent. Thus, even very small floating electrodes 202 will have the benefit of increasing the strength of the haptic effect.

Figure 3:
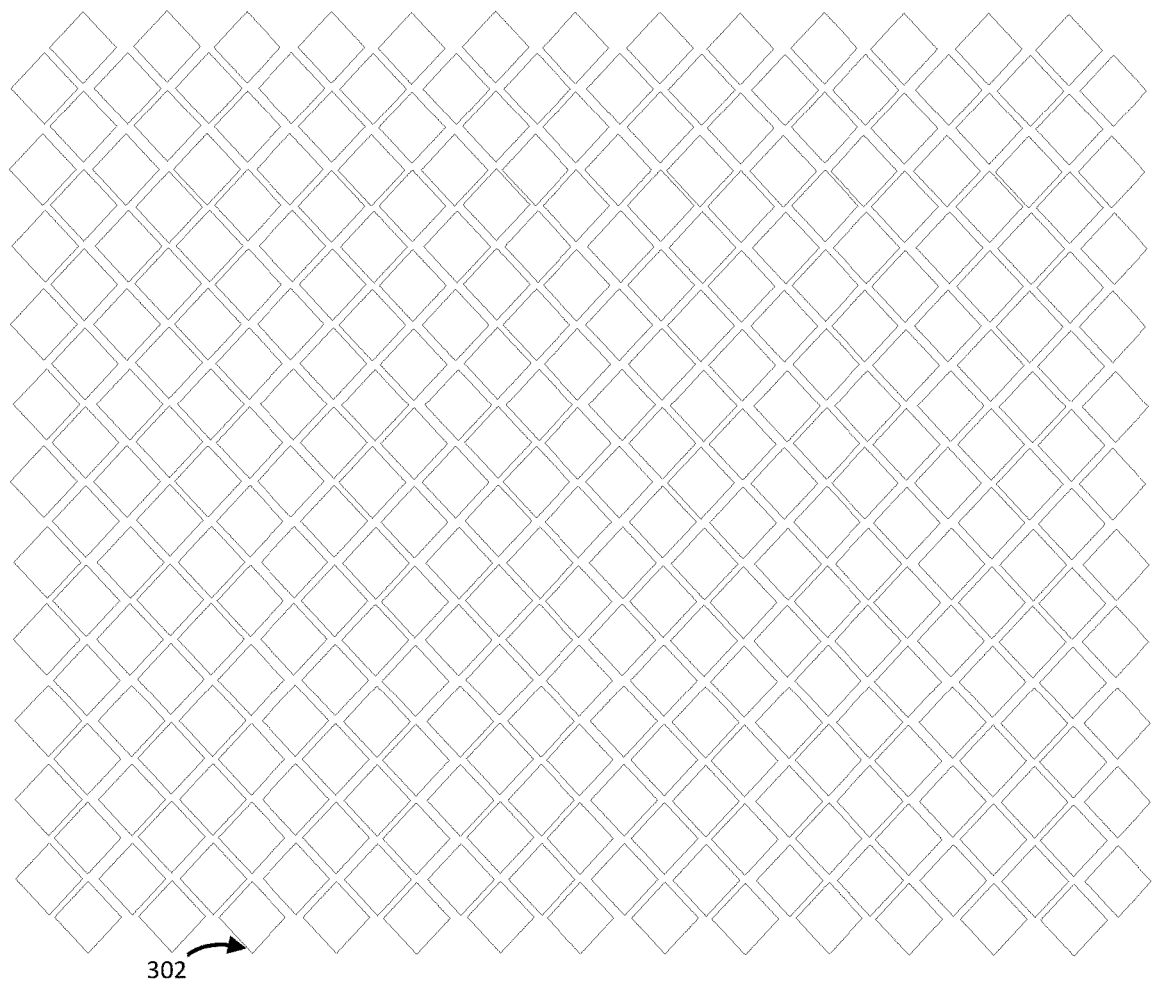
FIG. 3 depicts a schematic representation of one arrangement of electrodes in the top layer.

While small floating electrodes 202 provide some benefit, even greater benefit accrues from larger floating electrodes because the larger size will increase capacitive coupling to the control electrodes on the lower layer. FIG. 3 depicts another embodiment of a single-layer set of floating electrodes 303 where the size of each electrode 303 is increased. Here, each floating electrode 302 is a single diamond-shaped patch, aligned with the diamond shapes of the underlying control electrodes 102 or 104. This embodiment has the advantages of simplicity, low manufacturing cost, and robustness. As with the embodiment described above, these floating electrodes 302 will not disturb the sensing strategy. Additionally, the larger floating electrodes 302 offer stronger capacitive coupling to the lower layer. It should be noted that the strength of connection from the control electrodes 102 or 104 to each floating electrode 302 is dependent on the area of overlap. In this embodiment, the area of overlap is the size of a single diamond. While this is much greater than seen in the previous embodiment, it is still much smaller than the area of overlap associated with an entire row or column of diamonds, as in the "mirrored" approach.

One way to increase overlap area further is to employ larger diamond shapes for the floating electrodes 302. For instance, the diamonds may be twice as wide, providing four times the area. In this case, a floating diamond would be aligned at the intersection of one control electrode 102 on the first axis and one control electrode 104 on the second axis. To produce a strong haptic signal, the same voltage would be applied to each of the two control electrodes 102 and 104. A difficulty with this approach, however, is that the finger may not be large enough to lie above more than one such larger diamond electrode. As described above, it is preferable for the finger to lie above at least two electrodes having different potentials.

An alternative embodiment, therefore, consists of "tiled" patches as shown in FIGS. 4-7. Here, each floating electrode is a tile made by interconnection of two or more diamonds, where the diamonds align with the diamond shapes of the underlying control electrodes. Moreover, all of the diamonds on a given tile align with underlying diamonds on a single axis of electrodes. Thus, the "checkerboard" pattern of the underlying electrodes as depicted in FIG. 1 is also seen in the tiles. Tiles may be produced in a family of different sizes.

Figure 4A:
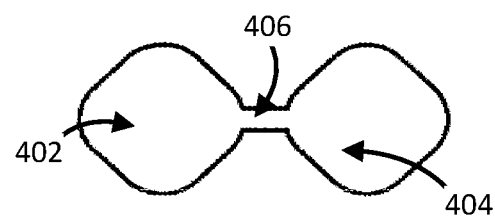
FIG. 4A depicts a "dumbbell-shaped" floating electrode and illustrates how it may be used to tile the top layer.

The smallest tiles in this family of floating electrodes each consist of two diamonds connected in a "dumbbell" shape, as shown in FIG. 4A. The two diamonds 402 and 404 are connected via a trace 406 forming a substantially "dumbbell" shape. Each dumbbell may be aligned with two diamonds on an individual control electrode 102 or 104, or with two diamonds on two neighboring control electrodes 102 or 104. In either case, the underlying diamonds should be controlled to substantially the same voltage in order to produce the strongest possible haptic effect. In addition, dumbbells that align with control electrodes 102 and 104 on two different axes may be brought to different potentials.

Figure 4B:
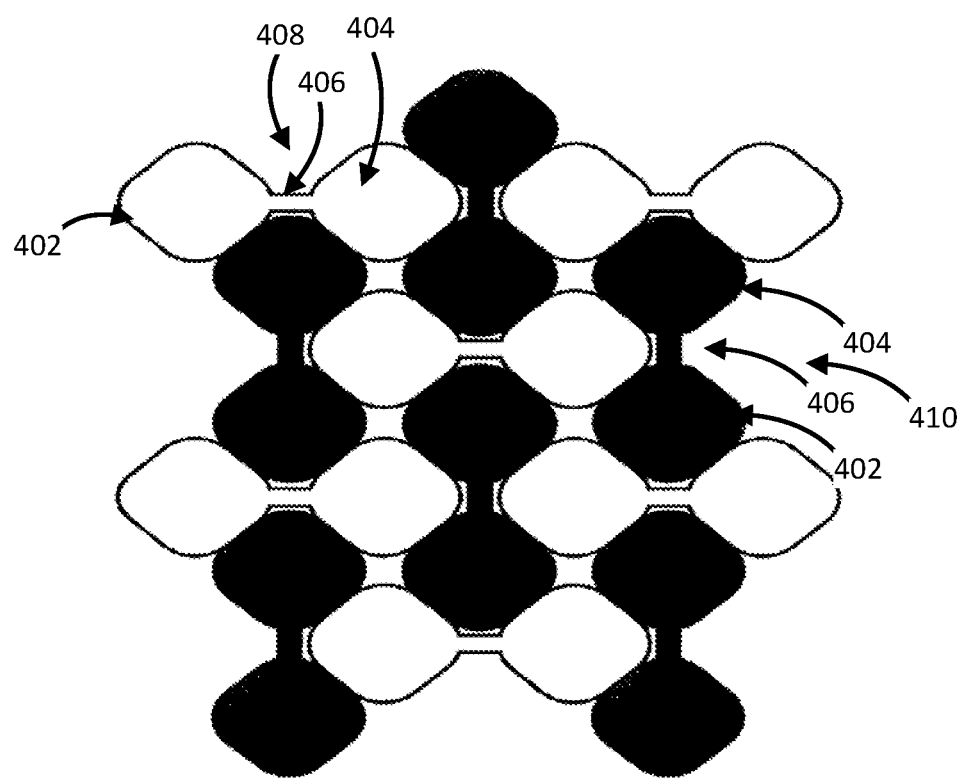
FIG. 4B depicts an arrangement of floating electrodes from FIG. 4A.

FIG. 4B depicts an arrangement of dumbbells where a first set of dumbbells 408 has the opposite charge as a second set of dumbbells 410. As an illustrative example, the first set of dumbbells 408 may have a positive charge while the second set off dumbbells 410 may have a negative charge. Adjacent sets of first dumbbells 408 are separated by the traces 406 joining electrodes in the second set of dumbbells 410.

Figure 5A:
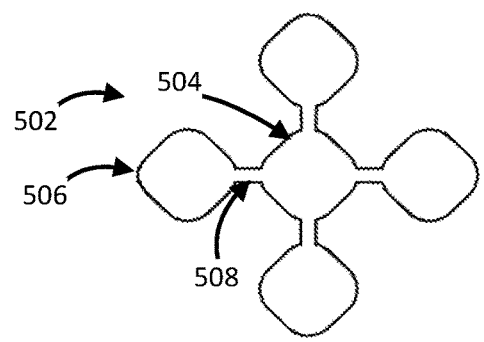
FIG. 5A depicts a "star-shaped" floating electrode and illustrates how it may be used to tile the top layer.

FIG. 5A depicts one embodiment of a group floating electrodes 502 having a larger tile in the same family. Here the tile consists of those diamonds lying on the diagonals of a 3×3 checkerboard pattern. Note that it is still possible to tile the plane with these tiles, and still possible to align each tile with underlying electrodes on a single axis. This larger tile pattern has the advantage of greater overlap area with the underlying electrodes. Consistent with this embodiment, a central electrode 504 is connected to at least four radial electrodes 506 via traces 508. In one embodiment, the angle between each radial electrode 506 is substantially the same. In another embodiment, the angle between each radial electrode 506 varies between each radial electrode 506.

In one embodiment, the control electrodes 102 and 104 and the floating electrodes 502 have substantially the same size and shape. In another embodiment, the control electrodes 102 and 104 and the floating electrodes 502 have different sizes and shapes. In another embodiment, the upper layer includes one floating electrode. In another embodiment, the upper layer includes a plurality of floating electrodes.

Figure 5B:
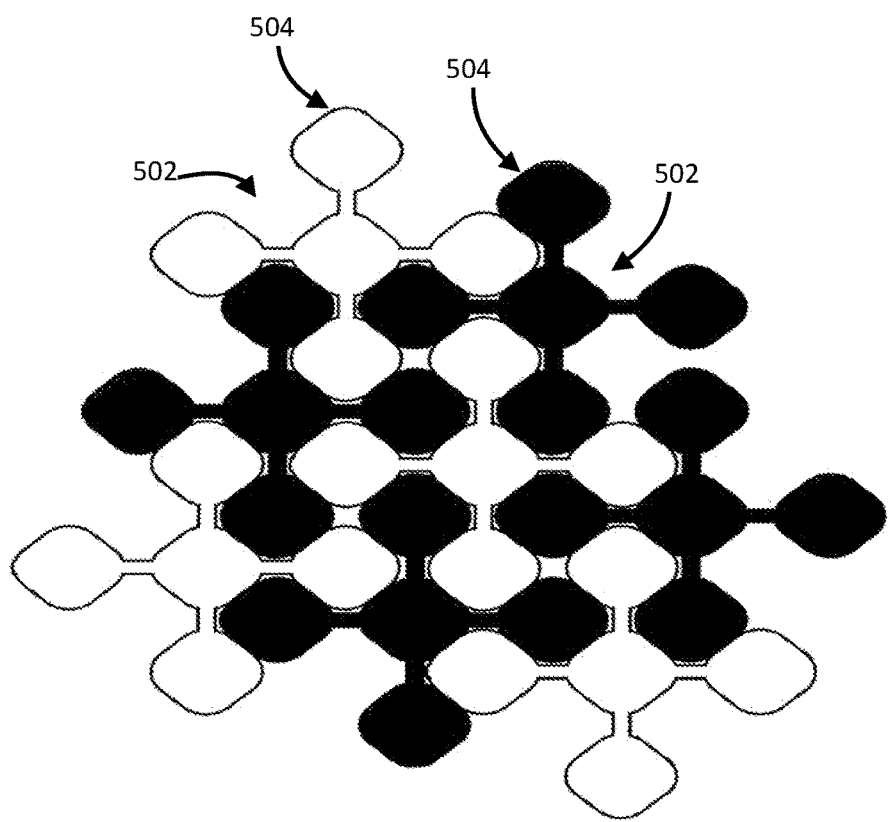
FIG. 5B depicts an arrangement of floating electrodes from FIG. 5A

FIG. 5B depicts one embodiment of an arrangement of groups of floating electrodes 502. Each group of floating electrodes 502 has a different charge than an adjacent group of floating electrodes 502. Further radial electrodes 506 on adjacent groups of floating electrodes 502 are separated by traces 508. In one embodiment, the haptic signal generated by the floating electrodes 502 is unipolar. In another embodiment, the haptic signal generated by the floating electrodes is bipolar.

Figure 6A:
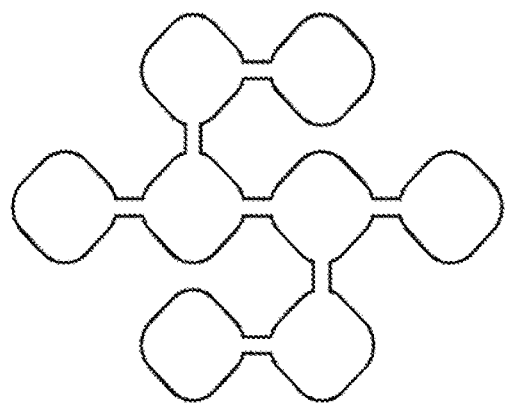
FIG. 6A depicts a "4×4" floating electrode and illustrates how it may be used to tile the top layer.
Figure 6B:
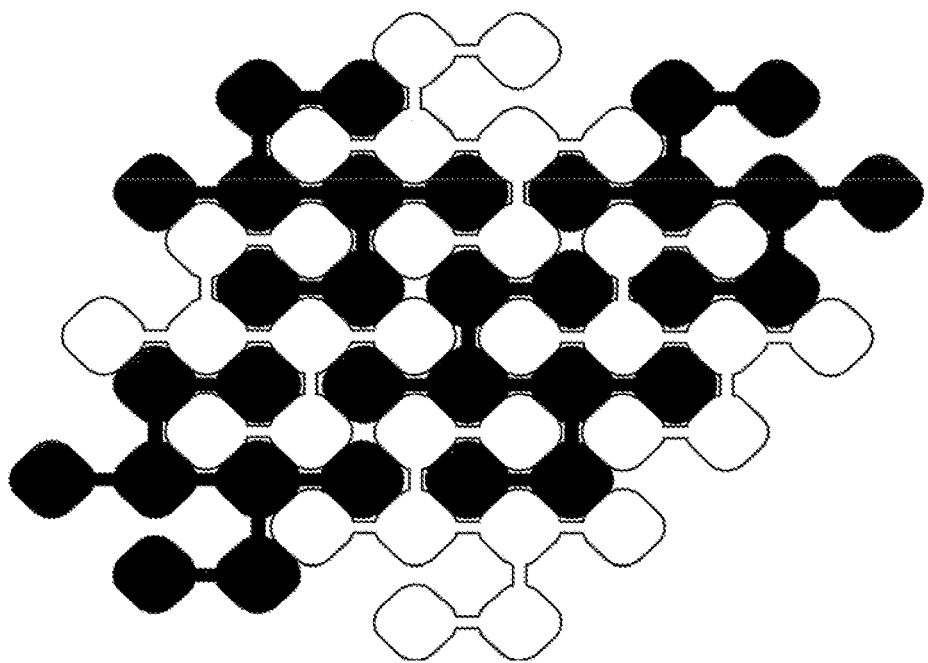
FIG. 6B depicts an arrangement of floating electrodes from FIG. 6A
Figure 7A:
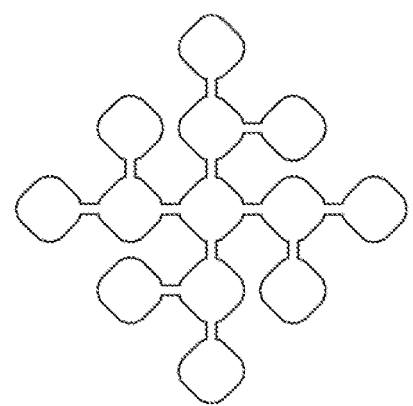
FIG. 7A depicts a "5×5" floating electrode and illustrates how it may be used to tile the top layer.
Figure 7B:
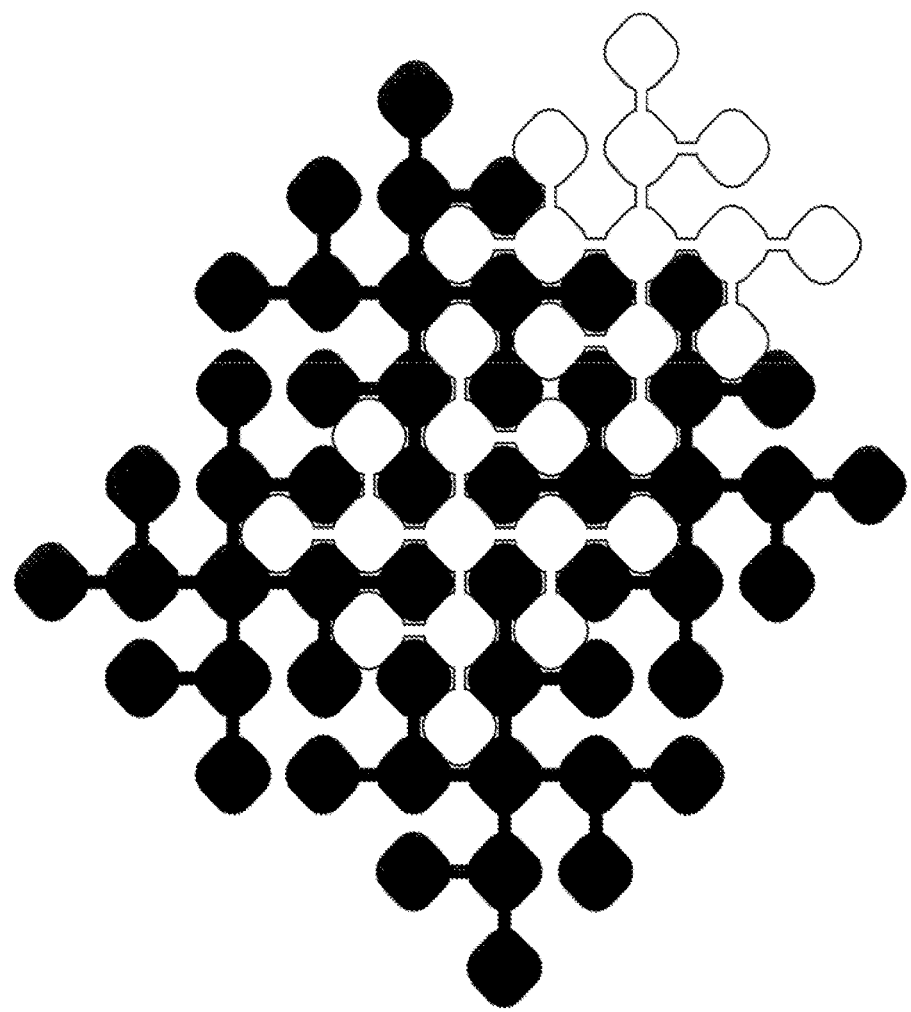
FIG. 7B depicts an arrangement of floating electrodes from FIG. 7A

FIGS. 6 and 7 show the next two larger tile patterns in this family, which come from a 4×4 and a 5×5 checkerboard, respectively. Even larger patterns are possible following the same basic "branched spoke" pattern. Larger patterns have the advantage of increased capacitive coupling from the underlying control electrodes, but may make sensing more difficult: due to the size of the floating electrodes, they will more strongly couple the finger to an entire set of control electrodes, making the location information more diffuse.

Figure 8:
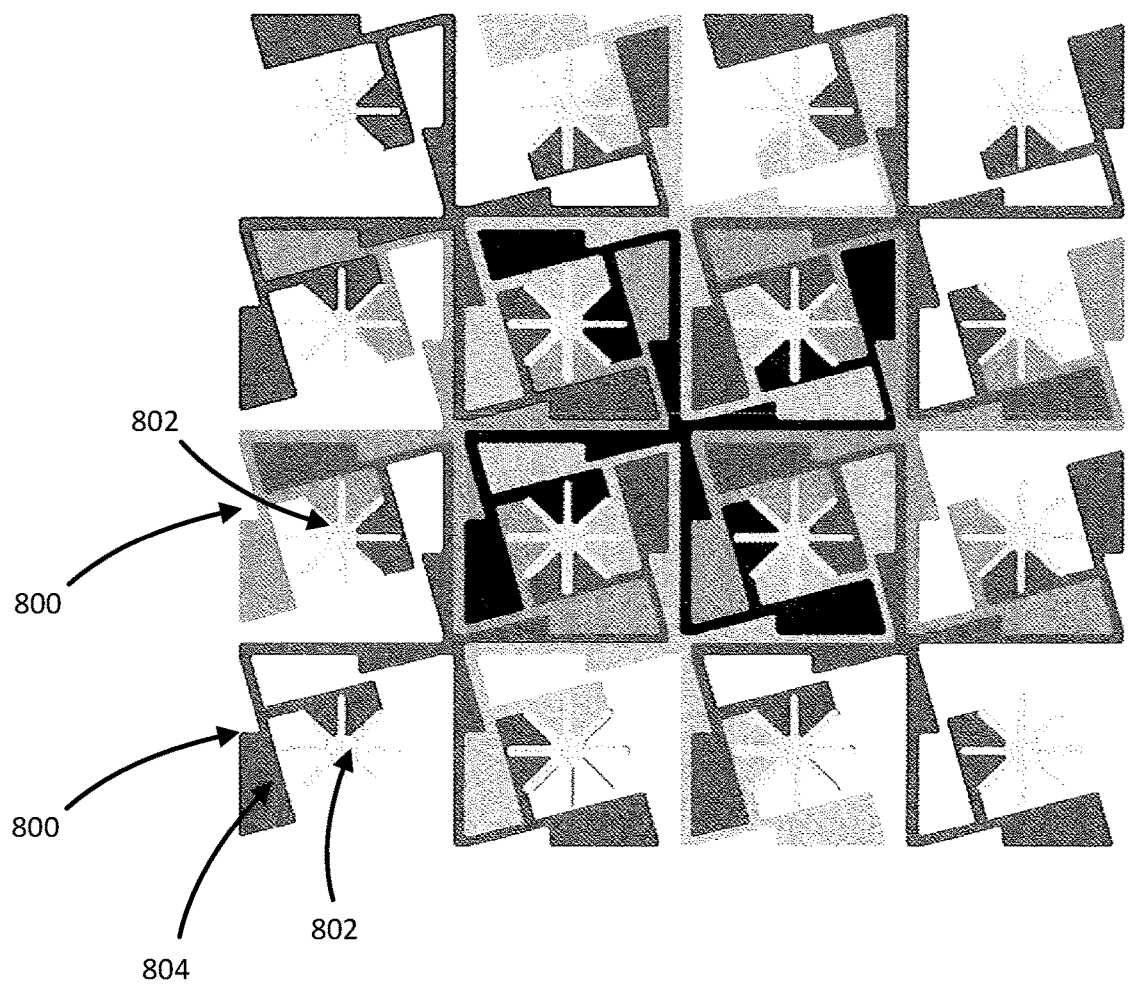
FIG. 8 depicts another embodiment of an electrode pattern and illustrates how it may be used to tile either the top or bottom layer.
Figure 9:
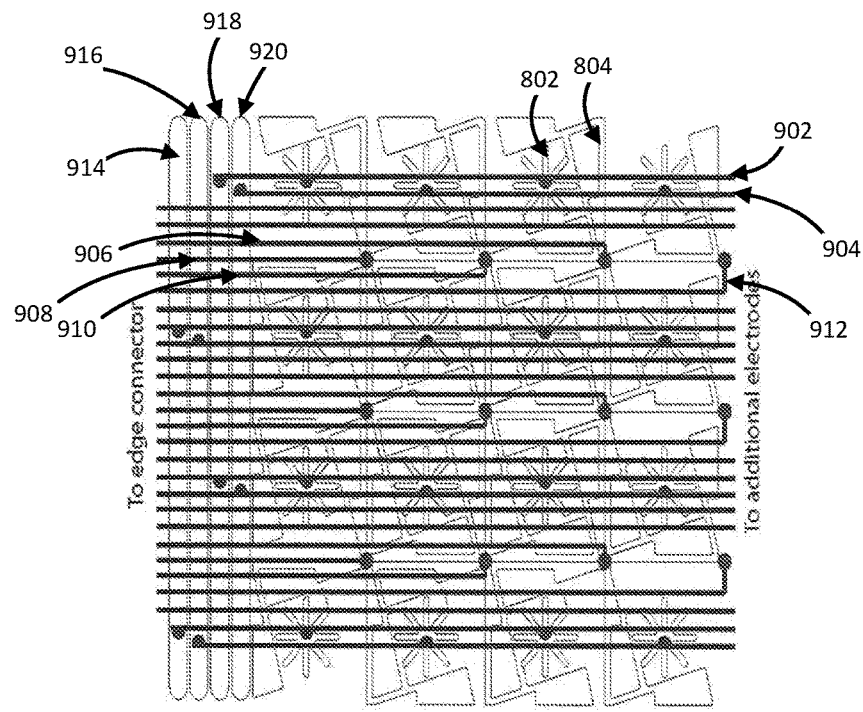
FIG. 9 depicts a method for making electrical connection electrodes.

FIGS. 8 and 9 depict another embodiment of electrode arrangements that combines the benefits of large floating electrodes with the need for high resolution sensing. This approach dispenses with the diamond shapes altogether, and instead uses tiles that are mirrored, so that tiles on both layers have the same shapes and are aligned. Moreover, the electrodes are sized to provide a strong capacitive coupling from the lower layer to the upper layer with the tiles being large enough so that the total number needed to cover the touch surface is reasonable (e.g., comparable to the total number of electrodes used by a traditional pattern using x and y electrodes), and each of the tiles interlock in such a way that the finger is always in contact with multiple electrodes and it is always possible to compute a unique finger position from the measured signals.

FIG. 8 is exemplary of electrode shapes that may be used for control electrodes and floating electrodes. Each electrode 800 includes a pattern consisting a first electrode 802 and a second electrode 804. The first electrode 802 is substantially star shaped and the second electrode 804 has a shape that intertwines with the star shape. In one embodiment, the second electrodes are shaped like "florets." In one embodiment, the second electrodes 804 are large, branched shapes that interlock with one another. Notably, the spatial extent of the florets is much greater than their spacing. For instance, as depicted in FIG. 8, the width of a second electrode 804 along the horizontal axis is nearly twice as great as the horizontal pitch of second electrode 804. In another embodiment, the horizontal and vertical pitch of the second electrode 804 may be 20 mm, and the area covered by a single second electrode 804 may be approximately 380 mm^2. Conversely, a diamond pattern, as shown in FIG. 1, may have a 5 mm diagonal, each diamond may have an area of 12.5 mm^2. Thus, one second electrode 804 has the same area as about 30 diamonds, or an electrode 150 mm in length. The first electrodes 802 are much smaller than the second electrodes 804 and do not interlock, but they provide additional signals that may be used to compute an accurate touch position. In a one embodiment, each second electrode 804 on the bottom layer is individually controlled, but the first electrodes 802 may be controlled in groups. For instance, one possibility is to have four groups of first electrodes 802. Along each horizontal row, alternating first electrodes 802 would be controlled in the same group, and along each vertical column, alternating second electrodes would be controlled in the same group. Grouping the first electrode 802 together reduces the number of control channels that are needed to control the first electrodes 802. During normal operation, when a first electrode 802 is engaged by a finger, or other appendage, the combination of a signal from the first electrode 802 and signals from one or more second electrodes 804 would be used to determine the exact location of touch.

Wherever a finger is placed on the top surface, it will be in close proximity to a number of second electrodes 804 and possibly a first electrode 802 electrode as well. Importantly, the signals from each possible finger location are unique, making it possible to compute the finger location based on the signals obtained from the electrodes. There are multiple ways to perform this "inverse" computation in which touch coordinates are extracted from signals. For instance, one approach is to store a set of signals for each touch location, then use these stored signals as a lookup table that returns touch coordinates. It is additionally advantageous to store a set of gradients at each touch location. The gradient information may be represented as a location-specific Jacobian matrix:

$$[\delta s] = [J(x, y)]\begin{bmatrix} \delta x \\ \delta y \end{bmatrix}$$

Here, [δs] represents the increment in signals that could be expected from a small change in finger location $[\delta x, \delta y]^T$ near the location (x,y), and J(x,y) is the Jacobian matrix. When a measurement is made, an approximate xy location can be found by finding the nearest signal set in the lookup table, then that approximate location can be refined by computing the pseudoinverse of the equation above and multiplying it by the difference between the measured and looked-up signals, then adding the result to the looked-up xy location. It should be noted that the pseudoinverse could be pre-computed and stored in memory as part of the lookup table. Of course, other methods of estimating the touch location may be used as well. For example, a neural network may be used.

Based on the finger location, electrodes may be selected for driving haptics. As an illustrative example, control electrodes may be used as described above to determine the location of engagement of the touch surface with an appendage, and floating electrodes on a layer separated from the control electrodes and conductively interacting with the control electrodes may perform haptic functions as previously discussed. Generally speaking, it is preferable to drive about half the area underneath the finger in one polarity, and about half the area in the opposite polarity. It is also preferable to group the electrodes of like polarity so that the mutual capacitance between them reinforces the signal strength.

Figure 10:
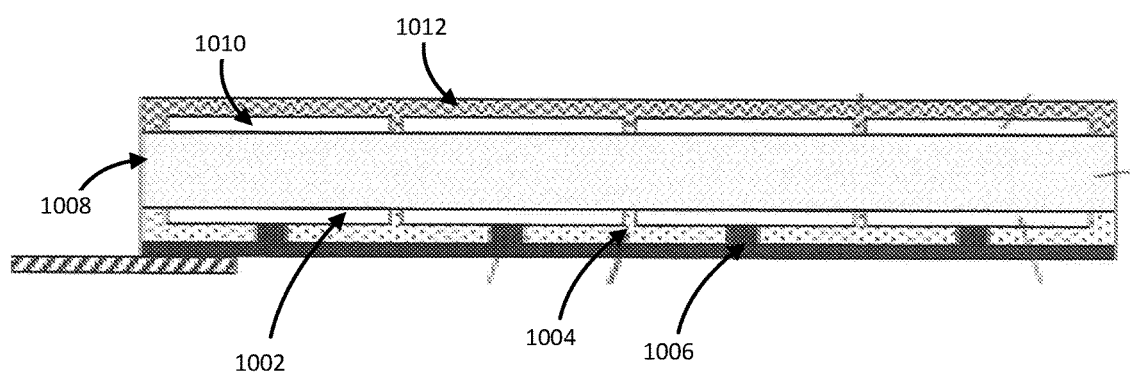
FIG. 10 is a cross-sectional view of a haptic touch screen using the electrode architecture of FIG. 9.

Electrical connection to the various electrodes may be made as illustrated in FIGS. 9 and 10. Referring first to FIG. 10, the touch panel includes a bottom layer 1002, insulating layer 1004, interconnect layer 1006, middle layer 1008, upper layer 1010 and cover layer 1012. The bottom 1002 layer may be coated with the insulating layer 1004 using any of a number of materials and processes known in the art. For instance, the insulating layer 1004 may be made of a transparent polymer. The insulating layer 1004 may be screen-printed, photolithographically etched, or otherwise patterned in order to leave openings that have access to each of the electrodes on the bottom layer. The interconnect layer 1006, may be applied to the surface of the insulating layer 1004 and then patterned to produce electrical connection to each of the electrodes. Alternatively, silver nanowires or other conductors that are not readily visible to the naked eye may be used to form the electrical connections. Additional layers for passivation, protection of the interconnects, index matching, and isolation (not shown) from electrical noise may also be applied.

FIG. 9 depicts one embodiment of a pattern of electrical connections on the interconnect layer 1006. A first connection line 902 connects alternating first electrodes 802 in a row with a second connection line 904 connecting first electrodes 802 not connected to the first connection line 902. Each connection line 902 and 904 is made of a transparent conductor. Additional connection lines 906, 908, 910 and 912 each connect to one second electrode 804. Additionally, rather than wide gaps between these conductors, there would normally be small deletion lines. In a preferred embodiment, the deletion lines would be 100 microns in width although thinner or thicker lines may also be used. The deletion lines may also be somewhat irregular in shape instead of being perfectly straight as shown in order to make visual detection more difficult. The semicircular and circular areas in FIG. 9 indicate locations where the interconnect electrodes would pass through the insulating layer and make connection to the electrodes of the bottom layer.

As indicated in FIG. 9, all electrical connections could be brought to one edge if desired. Alternatively, electrical connection could be made along multiple edges. FIG. 9 also illustrates the grouping of the first electrodes 802 separated into four groups. Associated with each group is a bus bar 914, 916, 918 or 920, which may be a part of the bottom layer. In others embodiments, interconnection of the first electrodes 802 is performed as necessary for grouping using other methods such as, but not limited to, a flex cable or on a control board or chip.

Many other patterns as well may be used to form the upper floating electrodes. For instance, it is possible to dispense with first electrodes 802 and use only second electrodes 804. The florets of second electrodes 804 may take virtually any shape that tiles the surface. It is only important that they capacitively couple to the lower electrodes well enough to produce the necessary haptic and sensing signals.

An important benefit of the floating upper layer 1010 and controlled lower layer 1012 architecture presented here is that it is tolerant of typical forms of damage to the touchscreen, such as scratches. This is because one, the lower layer electrodes 1002 are protected by a relatively thick middle transparent layer 1008, and two, the upper layer electrodes 1010 get their signals via capacitive coupling to the lower layer electrodes 1002 rather than conductive coupling to control electronics. Conductive coupling is compromised by scratches that transect electrodes whereas capacitive coupling is not. With the present invention, damage to top layer electrodes 1010 may lead to some loss of performance (e.g., the strength of the haptic effects), but should not keep either the touch sensing or haptic output from functioning altogether. In addition to protection from scratches, the present invention similarly provides protection from other forms of damage, such as abrasion, moisture, chemicals, electrostatic discharge, and even complete breaks of the cover lens (provided that the lower layer is a separate component from the cover lens).

Figure 11:
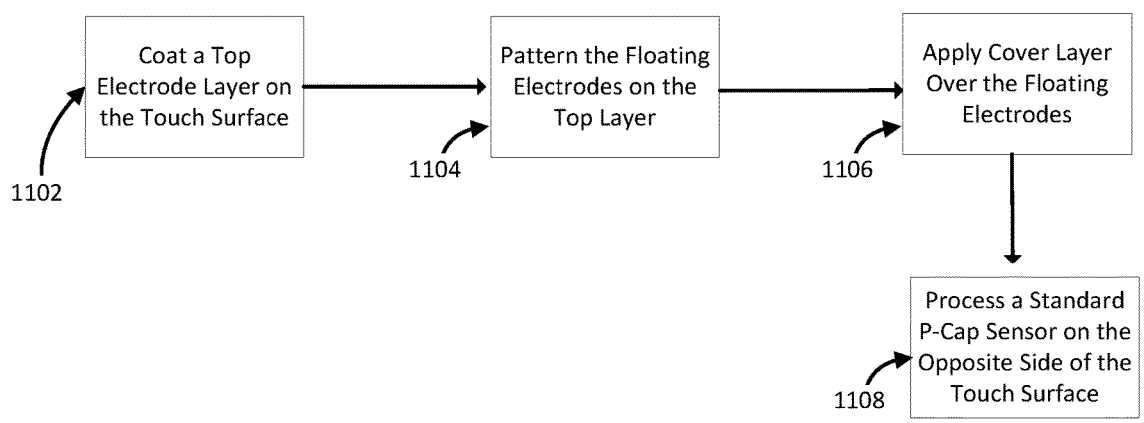
FIG. 11 depicts a schematic representation of a process of manufacturing a haptic touch system.

FIG. 11 depicts a schematic representation of the process used to manufacture a haptic device. In step 1102, the top surface of middle layer 1008 is coated with the upper electrode layer 1010. In step 1104, the floating electrodes are patterned from the upper layer 1010. The floating electrodes may be processed in a single piece, multi-up (mother sheet), or hybrid process (first start with sheet form and somewhere in the process cut into single sensors and continue with single piece processing). The floating electrodes may be formed using any of the methods described herein. In step 1106, a cover layer 1012 is applied over the floating electrodes in the top layer 1010. The cover layer 1012 may include films such as oleophobic, sapphire-like glass, index matching, anti-bacteria coatings, and other coatings known in the art. In step 1108, a standard P-cap sensor (as depicted in FIG. 1) is formed on the opposite side of middle layer 1008 (alternatively, it is possible to laminate a standard P-cap sensor to the opposite side of the glass; also alternatively for certain embodiments, to form mirrored electrodes on the bottom layer.)

Since the hard overcoat is processed before the P-cap sensor layers are present on the glass, higher processing temperatures can be used in the deposition or annealing of the overcoat which results in better performance and a wider selection of materials.

Laminating a P-cap sensor and using a cover sheet that contains the haptic electrodes is another way to implement this invention. Adding a cover sheet/lens to an existing P-cap sensor makes it cost effective and easy to add haptics to sensors that are already in the field. In this case an extra circuit to boost the haptic signal needs to be added to the electronics. Alternatively one can start with a standard P-cap touch screen and coat the opposite (touch) surface with the haptic electrodes and optional overcoat.

The middle layer thickness can range from 5 microns to 6 mm, although preferred thicknesses are from 100 to 500 microns. The thickness depends on the required mechanical strength, processing capabilities, required, haptic signal strength, maximum applied voltage, optical properties, etc.

As one having ordinary skill in the art would recognize, the present disclosure may be implemented on a variety of electrostatic devices to lower the driving voltage and keep the same desired haptic effects. Examples of such devices are electrostatic chucks, electro-adhesion based devices (robots, material handling, etc.) In one embodiment, the touch surface is a rigid surface. In another embodiment, the touch surface is a flexible surface including a flat, curved, bent, morphing or other flexible surface. Further, as the haptic electrodes do not need to be directly connected to the haptic signal, one can stack electrodes/nonconductive substrate over and over to attain an extremely large separation between the bottom electrodes and the most outer ones.

In the present disclosure, the words "a" or "an" are to be taken to include both the singular and the plural. Conversely, any reference to plural items shall, where appropriate, include the singular.

It should be understood that various changes and modifications to the presently preferred embodiments disclosed herein will be apparent to those skilled in the art. Such changes and modifications can be made without departing from the spirit and scope of the present disclosure and without diminishing its intended advantages. It is therefore intended that such changes and modifications be covered by the appended claims.

The invention claimed is:

1. A haptic touch screen including:
   a lower layer including a plurality of control electrodes;
   an upper layer including a plurality of haptic electrodes;
   a middle layer between the lower layer and upper layer,
   wherein the haptic electrodes are not conductively connected to control electronics and wherein the haptic electrodes are grouped with each group of haptic electrodes having a different charge.

2. The haptic touch screen of claim 1 wherein the haptic electrodes are not in electrical communication with one another.

3. The haptic touch screen of claim 1 wherein each haptic electrode mirrors a control electrode.

4. The haptic touch screen of claim 1 wherein a width of each haptic electrode greater than a characteristic distance between asperities on the skin of a fingertip.

5. The haptic touch screen of claim 1 wherein each haptic electrode is diamond shaped and is aligned with a corresponding diamond shaped control electrode.

6. The haptic touch screen of claim 5 wherein the each haptic electrode interconnects with at least one haptic electrode.

7. The haptic touch screen of claim 1 wherein each haptic electrode is dumbbell shaped.

8. The haptic touch screen of claim 1 wherein each haptic electrode has a smaller pitch than the pitch of each control electrode.

9. The haptic touch screen of claim 8 wherein the pitch of each control electrode is approximately 5 mm and each haptic electrode is 5 mm across.

10. The haptic touch screen of claim 1 wherein each haptic electrode has a smaller pitch than the pitch of each control electrode.

11. The method of claim 10 wherein the pitch of each control electrode is approximately 5 mm and each haptic electrode is 5 mm across.

12. A method of creating a haptic touch screen, the method including:
   forming an upper layer including a plurality of haptic electrodes;
   forming a lower layer including a plurality of control electrodes;
   forming a middle layer between the lower layer and upper layer, wherein the haptic electrodes are not conductively connected to control electronics and wherein the haptic electrodes are grouped with each group of haptic electrodes having a different charge.

13. The method of claim 12 wherein the haptic electrodes are not in electrical communication with one another.

14. The method of claim 12 wherein each haptic electrode mirrors a control electrode.

15. The method of claim 12 wherein a width of each haptic electrode greater than a characteristic distance between asperities on the skin of a fingertip.

16. The method of claim 12 wherein each haptic electrode is diamond shaped and is aligned with a corresponding diamond shaped control electrode.

17. The method of claim 16 wherein the each haptic electrode interconnects with at least one haptic electrode.

18. The method of claim 12 wherein each haptic electrode is dumbbell shaped.

* * * * *